No. 654,004. Patented July 17, 1900.
F. J. E. JOHANSSON.
DRIVING MEANS FOR BICYCLES.
(Application filed Apr. 14, 1900.)
(No Model.)

WITNESSES:
Ella L. Giles
Otto Munk

INVENTOR
Frans Johan Emil Johansson
BY
Richardson
ATTORNEYS

UNITED STATES PATENT OFFICE.

FRANS JOHAN EMIL JOHANSSON, OF STOCKHOLM, SWEDEN.

DRIVING MEANS FOR BICYCLES.

SPECIFICATION forming part of Letters Patent No. 654,004, dated July 17, 1900.

Application filed April 14, 1900. Serial No. 12,908. (No model.)

*To all whom it may concern:*

Be it known that I, FRANS JOHAN EMIL JOHANSSON, mechanician, of 12 Karlbergsvägen, Stockholm, Sweden, have invented an Improvement in Driving Means for Bicycles; and I do hereby declare the nature of my invention to be as follows.

This invention relates to driving means for bicycles which is so constructed as to admit of an automatic change in the velocity ratio of the gearing while riding.

Figure 1:
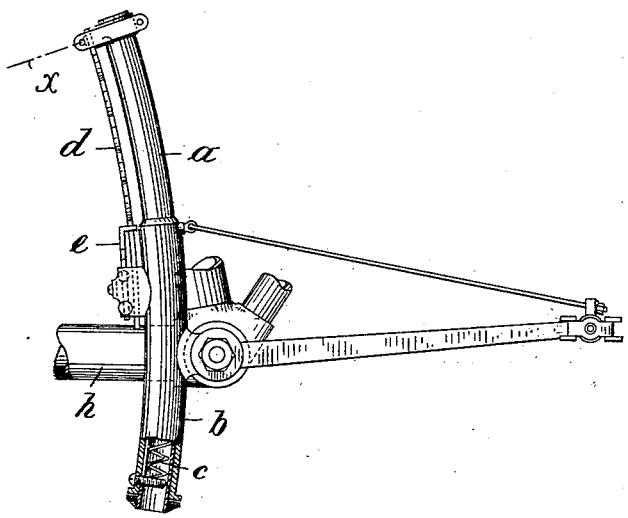
Figure 3:
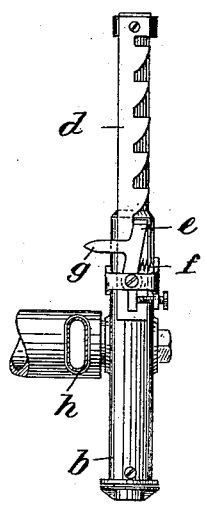
Figure 2:
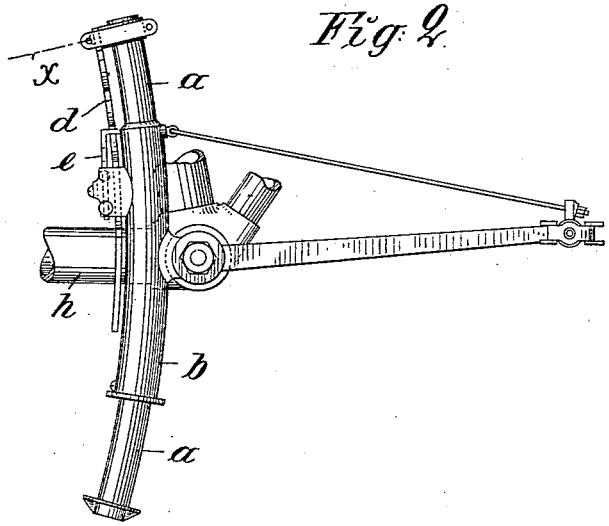

In the accompanying drawings such a treadle is illustrated in Figures 1 and 2 in a side view, adjusted for two different velocity ratios, and in Fig. 3 viewed from behind.

One leg of the treadle is composed of two parts $a$ $b$, the upper one, $a$, of which can be shifted inside or outside the other, $b$, which is nearer the center of oscillation of the treadle and is pressed outward by a spring $c$. The driving-chain or toothed rack $x$ (if such rack be employed) for actuating the driving-wheel of the bicycle is connected to the part $a$. If in riding a greater force be used for depressing the treadle than the spring $c$ can resist, the spring will be compressed and the part $a$ forced in Fig. 2, so that the position of the driving chain or rack in relation to the driving-shaft is changed and a different velocity ratio obtained. If the pressure on the treadle is subsequently diminished, the spring $c$ will expand and the leg be extended to its usual length, Fig. 1, the normal velocity ratio being thereby restored.

In order to retain the part $a$ in its depressed position even when the pressure on the treadle ceases, and thus retain a certain velocity ratio, a toothed bar $d$ may be arranged at the side of the leg $a$ $b$, said bar being secured to the movable part $a$, while on the part $b$ is fixed a latch $e$, acted upon by a spring $f$, so as to snap into the teeth of the latter. This latch is provided with a lateral projection $g$, which strikes one of the rods $h$ of the frame of the bicycle when the treadle is pressed backward, thus forcing the latch sidewise out of engagement with the bar $d$, so that the part $a$ is released and forced out of its normal position by the spring $c$ and the normal velocity ratio restored.

Having now particularly described and ascertained the nature of my said invention and in what manner the same is to be performed, I declare that what I claim is—

1. A bell-crank driving-lever for bicycles, comprising legs $a$, $b$, the leg $a$ being movable in relation to and along the leg $b$, a driving connection leading from the movable leg and a spring for pressing the leg $a$ outwardly in relation to the leg $b$, said spring being arranged to yield under excessive pressure on the treadle whereby the length of the lever-arm $a$ will be adjusted automatically.

2. In combination with a bell-crank-lever treadle having the two-part leg, one part of which slides in relation to and along the other, a toothed bar secured to the movable part, a latch $e$ fixed to the fixed part and having a projection adapted to strike the frame of the machine in a certain position of the lever by which the latch can be disengaged from the toothed bar, substantially as described.

In witness whereof I have hereunto set my hand in presence of two witnesses.

FRANS JOHAN EMIL JOHANSSON.

Witnesses:
BIRGER LINDH,
H. TELANDER.